United States Patent
Kamimori et al.

(10) Patent No.: US 7,211,324 B2
(45) Date of Patent: May 1, 2007

(54) METHOD OF FORMING FILM HAVING A HEAT SHIELDING FUNCTION, LAMINATE FILM FORMED BY THE METHOD, AND ARTICLE COATED WITH THE LAMINATE FILM

(75) Inventors: Isao Kamimori, Kanagawa (JP); Yutaka Masuda, Kanagawa (JP); Takaaki Kato, Kanagawa (JP); Hiroyuki Nagano, Aichi (JP)

(73) Assignee: Kansai Paint Co., Ltd., Kanagawa (JP)

( * ) Notice: Subject to any disclaimer, the term of this patent is extended or adjusted under 35 U.S.C. 154(b) by 0 days.

(21) Appl. No.: 10/379,565

(22) Filed: Mar. 6, 2003

(65) Prior Publication Data

US 2003/0185993 A1    Oct. 2, 2003

(30) Foreign Application Priority Data

| Mar. 7, 2002 | (JP) | ............................ 2002-061657 |
| Oct. 4, 2002 | (JP) | ............................ 2002-292130 |
| Dec. 27, 2002 | (JP) | ............................ 2002-381015 |

(51) Int. Cl.
  *B32B 27/20* (2006.01)
  *B32B 19/02* (2006.01)
  *B32B 33/00* (2006.01)

(52) U.S. Cl. ..................... 428/323; 428/328; 428/332; 428/334; 428/336; 428/339

(58) Field of Classification Search ................ 428/332, 428/334, 335, 336, 339
  See application file for complete search history.

(56) References Cited

U.S. PATENT DOCUMENTS

| 6,017,589 A | 1/2000 | Kuriyama |
| 6,514,568 B1 * | 2/2003 | Nagano et al. .......... 427/407.1 |

FOREIGN PATENT DOCUMENTS

| JP | 06-015223 A1 | 1/1994 |
| JP | 11-104563 A1 | 4/1999 |
| JP | 11-302549 A1 | 11/1999 |
| JP | 2002-060698 A1 | 2/2002 |

* cited by examiner

*Primary Examiner*—Monique R. Jackson
(74) *Attorney, Agent, or Firm*—Rader, Fishman & Grauer PLLC (57) ABSTRACT

A laminate film having heat shielding property and jet blackness with clearness can be obtained by the steps of: applying a heat shielding coating (I) containing a compound which does not absorb infrared radiation and having a heat shielding function to form the corresponding heat cured or uncured film; applying thereto a black base coating (A) containing a perylene black pigment, and/or an azomethine pigment, and/or an azo dye to form the corresponding film; applying a color clear coating (B) containing a black dye onto the heat cured or uncured film of the black base coating (A) to form the corresponding film; applying thereto a clear coating (C) to form the corresponding film; and heat curing a laminate film having the films of the heat shielding coating (I), the black base coating (A), the color clear coating (B) and the clear coating (C) stacked one after another.

26 Claims, 2 Drawing Sheets

METHOD OF FORMING FILM HAVING A HEAT SHIELDING FUNCTION, LAMINATE FILM FORMED BY THE METHOD, AND ARTICLE COATED WITH THE LAMINATE FILM

TECHNICAL FIELD TO WHICH THE INVENTION

The present invention relates to a method of forming a film which assumes a jet black color and does not absorb heat, thereby having a heat shielding function; and a laminate film having a film structure obtained by the film forming method. In the present invention, by disposing at least one layer of a color clear coating having a dye, a film acquires a heat shielding property and jet black color with transparent clearness.

BACKGROUND OF THE INVENTION

Carbon black pigments have conventionally been employed for forming a black film. Carbon black pigments have a primary particle size as fine as 10 to 30 nm. As its particle size becomes smaller, the jet blackness level increases and the jet black color acquires more preferred aesthetic quality.

The black film obtained using carbon black however absorbs a solar light and changes it into heat energy so that a marked temperature increase occurs. When an automobile in a black color is left under the blazing sun in summer, the surface temperature of the film approaches even to 80° C. Infrared radiation of a sunlight having a wavelength as long as 700 nm or greater is known to be absorbed by carbon black in a film and converted into heat so that it is highly effective for raising the temperature of the film.

Thus, a film coated in black causes a drastic temperature increase out of doors compared with a film in another color. An automobile coated in black involves the problem of energy saving, because in summer, an air conditioner of such an automobile does not work well and much energy is used for cooling its inside. A member such as a fuel tank of a motorbike, which is brought into direct contact with the human skin, becomes too hot and there is a danger of a rider suffering a burn.

A black pigment which does not absorb infrared radiation and therefore hardly generates heat has been developed. For example, perylene black (PBk31, PBk32) assumes a black color in spite of having a skeleton slightly different from that of a perylene pigment. It is known as a heat shielding black pigment, because it does not absorb infrared radiation.

This perylene black which does not absorb infrared radiation is therefore superior to carbon black in heat shielding effect. Its heat shielding effect is however insufficient, because it cannot reflect all the infrared rays and permits transmission of some of them through the film.

The perylene black has a dark chestnut color tone so that it is inferior in jet blackness level and therefore, aesthetic quality of black color to carbon black. Perylene black was therefore not employed for industrial products in which aesthetic quality is required, for example, automobiles and motorbikes and its use was limited to special purposes.

Use of a color clear coating for heightening jet blackness degree of the resulting film has already been reported. For example, a method of applying a color clear coating of a black dye onto a black color base or applying a color clear coating containing carbon black to a dark metallic color is published in Japanese Laid-Open Patent Publication No. H11-104563 (1999). These inventions are however insufficient from the viewpoint of a heat shielding effect.

In Japanese Laid-Open Patent Publication No. H11-302549 (1999) are disclosed inventions relating to an infrared reflective composition containing 0.1 percent by weight or less of carbon black as a coloring component in the resin composition and a pigment and/or dye having infrared reflection and/or infrared transmission characteristics with slight infrared absorption; and an infrared reflector essentially provided with a first layer composed of a resin composition with slight infrared absorption and an infrared reflective component and a second layer which is formed over the first layer and substantially transmits or reflects infrared rays.

The above-described invention does not include any specific example of a dye excellent in heat shielding effect. Moreover, it does not include any description about effects of having a color clear layer containing a dye for attaining both heat shielding property and jet black color tone. Even if a dark color tone is available by using "infrared reflective layer plus infrared transmitting layer" in combination, it is insufficient for attaining both a heat shielding effect and "jet blackness with clearness".

In Japanese Laid-Open Patent Publication No. 2002-60698, disclosed is an invention of actualizing various color tones including dark color while maintaining a high infrared reflectance as a whole by disposing an infrared reflecting layer having a high infrared reflectance and an infrared transmitting layer obtained using an infrared transmitting layer-forming composition which contains a resin component and a pigment showing 50% or less absorptance of infrared rays having a wavelength of from 800 to 1600 nm.

Use of "infrared reflecting layer plus infrared transmitting layer" in combination according to the above-described invention is insufficient for actualizing both heat shielding effect and "jet blackness with clearness".

There is accordingly a demand for a method of forming a film having both a heat shielding effect and jet blackness with transparent clearness; and a film structure obtained by the film forming method.

SUMMARY OF THE INVENTION

An object of the present invention is to provide a method capable of forming a film which is as free as possible from a temperature rise even out of doors; a film formed by this method and an article coated with this film.

As a result of an extensive investigation on a film forming method using various types of pigments and dyes with a view to developing a jet black film having a heat shielding function, it has been found that a method of forming a film having a heat shielding function and jet blackness with transparent clearness and such a film structure can be attained by using a heat shielding coating (I), a black base coating (A), a color clear coating (B) containing a dye (b), and a clear coating (C) in appropriate combination, leading to the completion of the present invention.

The present invention relates to a method of forming a film having a heat shielding function, which comprises the following steps 1 to 5:

Step 1: applying a heat shielding coating (I) containing a compound which does not absorb infrared radiation and having a heat shielding function to form the corresponding heat cured or uncured film;

Step 2: applying thereto a black base coating (A) containing a perylene black pigment, and/or an azomethine pigment, and/or an azo dye to form the corresponding film;

Step 3: applying a color clear coating (B) containing a black dye onto the heat cured or uncured film of the black base coating (A) to form the corresponding film;

Step 4: applying thereto a clear coating (C) to form the corresponding film; and Step 5: heat curing a laminate film having the films of the heat shielding coating (I), the black base coating (A), the color clear coating (B) and the clear coating (C) stacked one after another.

Alternatively, the method may comprise the following steps 1 to 4:

Step 1: applying a heat shielding coating (I) containing a compound which does not absorb infrared radiation and having a heat shielding function to form the corresponding film;

Step 2: applying thereto a black base coating (A) containing a perylene black pigment, and/or an azomethine pigment, and/or an azo dye to form the corresponding film;

Step 3: applying a color clear coating (B) containing a black dye onto the heat cured or uncured film of the black base coating (A) to form the corresponding film; and Step 4: heat curing a laminate film having the films of the heat shielding coating (I), the black base coating (A) and the color clear coating (B) stacked one after another.

Further alternatively, the method may comprise the following steps 1 to 4:

Step 1: applying a black base coating (A) containing a perylene black pigment, and/or an azomethine pigment, and/or an azo dye to form the corresponding film;

Step 2: applying a color clear coating (B) containing a black dye on the heat cured or uncured film of the black base coating (A) to form the corresponding film;

Step 3: applying a clear coating (C) to form the corresponding film; and

Step 4: heat curing a laminate film having the films of the black base coating (A), the color clear coating (B) and the clear coating (C) stacked one after another.

EXEMPLARY EMBODIMENTS OF THE INVENTION

A description will next be made of a method of forming a film having a heat shielding function and jet blackness; and a laminate film having a film structure obtained by the film forming method.

The film structure obtained by the method of forming a film having a heat shielding function is any one of the laminate films as shown in FIGS. 1 to 4.

Figure 1:
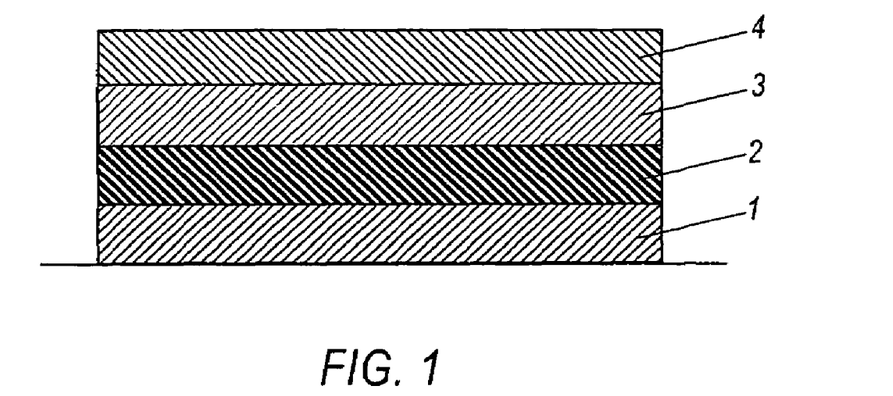
FIG. 1 is a schematic view of a laminate film having a film structure composed of heat shielding coating (I), black base coating (A), color clear coating (B) and clear coating (C).

The coated film of the present invention will next be described. FIG. 1 is a cross-sectional view of a film having a structure obtained by the film forming method having the following "Steps 1 to 5." By this method, a highly jet black film having a function of blocking heat or infrared radiation is available.

A method of forming a film having a heat shielding function, which comprises the following steps 1 to 5:

Step 1: applying a heat shielding coating (I) containing a compound which does not absorb infrared radiation and therefore having a heat shielding function to form the corresponding film;

Step 2: applying thereto a black base coating (A) containing a perylene black pigment, and/or an azomethine pigment, and/or an azo dye to form the corresponding film, Step 3: applying a color clear coating (B) containing a black dye onto the heat cured or uncured film of the black base coating (A) to form the corresponding film, Step 4: applying thereto a clear coating (C) to form the corresponding film; and Step 5: heat curing a laminate film having the films of the heat shielding coating (I), the black base coating (A), the color clear coating (B) and the clear coating (C) stacked one after another.

There is no particular limitation imposed on a material to be coated by the film forming method of the present invention and a steel plate, plastic, mortar and slate are usable. Examples include steel plates for automobile bodies or parts having a complex shape, plastics to be applied directly, and materials which have been undercoated with a cationic electrodeposition coating and cured.

The films of the present invention will next be described based on accompanying drawings. In FIG. 1, a film 1 has been formed by Step 1 and does not absorb infrared radiation. A black base coating film 2 is formed by Step 2. A color clear coating film 3 is formed by Step 3. A clear coating film 4 is formed by Step 4.

These films 1 to 4 are stacked one after another, followed by curing by heating, whereby a laminate film having a heat shielding function can be formed.

Heat Shielding Coating (I)

The heat shielding coating (I) usable in the present invention, containing a compound which does not absorb infrared radiation and therefore having a heat shielding function is preferably free of carbon black in order to improve a heat shielding effect. When it is applied to an outside plate of an automobile body, it is used as an intermediate coat containing, instead of carbon black, a compound which does not absorb infrared radiation.

Such a compound which does not absorb infrared radiation is, for example, aluminum flakes, titanium oxide, "PALIOGEN BLACK L-0084" (trade name; product of BASF) as a perylene black pigment, "CHROMOFINE BLACK A-1103" (trade name; product of Dainichiseika Color & Chemicals) as an azomethine pigment, ochre, colcothar, "CYANINE BLUE G314" (trade name; product of Sanyo Color Works) as phthalocyanine blue, phthalocyanine green, and inorganic calcined pigment "DAIPYROXIDE COLOR BROWN #9290" or "DAIPYROXIDE COLOR BLACK #9590" (each, product of Dainichiseika Color & Chemicals). "NEOZAPON X-55" (trade name of chromium complex dye; product of BASF) which serves both as an azo dye and a metal complex dye is also effective. At least one compound selected from the above-described compounds is added, as the compound which does not absorb infrared radiation, in an amount of from 0.1 to 200 parts by weight based on 100 parts by weight of the resin content of the heat shielding coating (I).

The heat shielding coating (I) may contain, in addition to the compound which does not absorb infrared radiation, another pigment. For example, coloring pigments such as titanium white, carbon black and iron oxide, and extenders such as talc, aluminum silicate and baryta are usable.

As the resin composition of the heat shielding coating (I), an ordinarily employed thermosetting resin composition is preferred. It is possible to add, for example, at least one resin selected from acrylic resins, vinyl resins, polyester resins, alkyd resins and urethane resins having one or more than one functional group selected from a hydroxyl group, a carboxyl group, a silicon-containing group, an epoxy group, and an isocyanate group which may be blocked. When a plastic surface such as polypropylene is coated, one or more than one polymer selected from chlorinated polyolefin, ethylene, propylene, butene and methylbutene; or a radical copolymer of such an olefin with vinyl acetate, butadiene, an acerbate or a methacrylate, for example, chlorinated polyethylene, chlorinated polypropylene, chlorinated ethylene-propylene copolymer or chlorinated ethylene-vinyl acetate copolymer may be added.

Also a polymer obtained by graft polymerization of a polymerizable monomer on chlorinated polyolefin is usable. Examples of the polymerizable monomer include alkyl esters of (meth)acrylic acid, alkoxy esters of (meth)acrylic acid, glycidyl (meth)acerbate, addition compound of glycidyl (meth)acerbate and monocarboxylic acid, hydroxyalkyl (meth)acerbate, acrylic acid and methacrylic acid. Chlorinated polyolefin imparted with water dispersibility can be applied to a water paint.

As a crosslinking agent for the heat shielding coating (I), usable is one or a mixture of at least two compounds selected from melamine resins, urea resins, polyisocyanate compounds which may be blocked, carboxyl-containing compounds and epoxy-containing compounds which are reactive with the functional group of the resin.

Based on the total weight of the fundamental resin and crosslinking agent, the former is added in an amount of from 50 to 90%, especially 65 to 85%, while the latter is added in an amount of from 50 to 10%, especially from 35 to 15%.

Such a resin composition may be used as an organic solvent type coating by diluting it with an organic solvent or as a water paint by adding a basic compound such as amine, and dispersing or emulsifying the resulting mixture in water.

As the organic solvent, conventionally known ones are usable. Examples include hydrocarbon solvents such as hexane, heptane, xylene, toluene and cyclohexane, ester solvents such as methyl acetate, ethyl acetate, ethylene glycol monomethyl ether acetate, and diethylene glycol monomethyl ether acetate, ether solvents such as isopropyl ether, ethylene glycol monomethyl ether and diethylene glycol monobutyl ether, alcohol solvents such as ethyl alcohol, butyl alcohol and hexyl alcohol, and ketone solvents such as methyl isobutyl ketone, methyl ethyl ketone, isophorone and acetophenone.

Examples of the basic compound such as amine include hydroxides of an alkali metal or alkaline earth metal such as sodium hydroxide, potassium hydroxide, lithium hydroxide, calcium hydroxide and barium hydroxide; ammonia; primary monoamines such as ethylamine, propylamine, butylamine, benzylamine, monoethanolamine, neopentanolamine, 2-aminopropanol and 3-aminopropanol; secondary monoamines such as diethylamine, diethanolamine, di-n- or di-iso-propanolamine, n-methylethanolamine and N-ethylethanolamine; tertiary monoamines such as dimethylethanolamine, trimethylamine, triethylamine, triisopropylamine, methyldiethanolamine and dimethylaminoethanol; and polyamines such as diethylenetriamine, hydroxyethylaminoethylamine, ethylaminoethylamine and methylaminopropylamine.

The heat shielding coating (I) can be prepared by mixing the compound which does not absorb infrared radiation, the another pigment, and the fundamental resin such as vinyl resin or alkyd resin in an organic solvent or water, charging a medium such as glass beads or zirconia beads in the resulting mixture, dispersing it in a paint shaker into particles having a particle size of 0.1 μm or less to prepare a pigment-dispersed paste containing 10 to 50 percent by weight of the pigment, and then, adding thereto the fundamental resin, a melamine resin as a crosslinking agent, additive, organic solvent or water.

When aluminum flakes are used as the compound which does not absorb infrared radiation and another pigment is not added, it is possible to stabilize the dispersion only by stirring and mixing so that dispersion of the pigment is not necessary. In such a case, the heat shielding coating is prepared, for example, by mixing the compound which does not absorb infrared radiation with an alkyd resin, melamine resin, solvent and additive, followed by stirring.

Upon application, the heat shielding coating (I) is preferably adjusted to have a solid content of from 10 to 60 percent by weight, preferably from 20 to 50 percent by weight; a hiding film thickness (Note 1) of 25 μm or greater, preferably 30 to 50 μm; and a viscosity of from 10 to 30 sec as measured by Ford cup #4 at 20° C.

(Note 1) Hiding film thickness is a value determined by adhering a hiding power test paper having monotone checkered patterns as defined by JIS K 54007.2(2)(f) to a mild steel plate, applying the heat shielding coating (I) onto the paper while gradually increasing its film thickness, observing the coated surface under a diffused daylight after drying and curing, and measuring by an electromagnetic film thickness gauge the minimum thickness (μm) which hides monotone checkered patterns on the hiding power test paper.

The heat shielding coating (I) is applied by air spray, airless spray or electrostatic coating equipment to give a cured film thickness at least equal to the hiding film thickness, for example, 25 μm.

The heat shielding coating (I) is required to have a heat shielding property, because the black base coating (B) containing a perylene black pigment or azomethine pigment, which will be applied subsequently, has insufficient heat shielding property.

Figure 4:
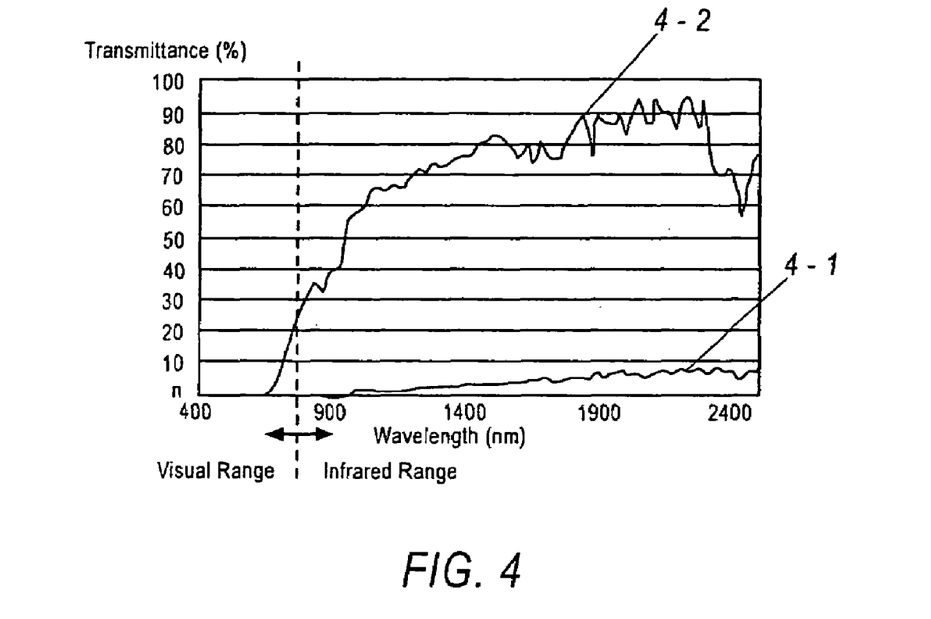
FIG. 4 is a graph showing a comparison in the transmittance in an infrared region between films obtained by adding perylene black and carbon black to an acrylic resin coating, respectively.

To explain this, transmittance of a film in an infrared range was compared between an acrylic resin coating added with perylene black and an acrylic resin coating added with carbon black and the results are shown in FIG. 4. The film (4-1) containing carbon black has a low transmittance in an infrared range of from 700 to 2500 nm because it absorbs infrared radiation, while the film (4-2) containing perylene black exhibits a high transmittance in an infrared range so that infrared radiation passing through the film reaches the underlying heat shielding coating (I).

Black Base Coating (A)

The black base coating (A) contains a perylene black pigment or an azomethine pigment or an azo dye.

Examples of the perylene black pigment include "PALIOGEN BLACK L-0084" (trade name; product of BASF), while those of the azomethine pigment include "CHROMOINE BLACK A-1103" (trade name; product of Dainichiseika Color & Chemicals). As the black base coating (A), an inorganic calcined pigment "DAIPYROXIDE COLOR BROWN #9290" and "DAIPYROXIDE COLOR BLACK #9590" (each product of Dainichiseika Color & Chemicals) are also usable.

As an azo dye, "NEOZAPON X-55" (trade name of chromium complex dye; product of BASF) which also serves as a metal complex dye is suited.

The black base coating (A) is prepared in the following manner: first, a pigment dispersed paste is prepared by mixing the perylene black pigment and/or azomethine pigment, and/or azo dye, another pigment, a pigment dispersing resin which may be the same or different from the fundamental resin and an organic solvent or water, putting a medium such as glass beads or zirconia beads in the resulting mixture and dispersing it in a paint shaker or ball mill.

A fundamental resin, crosslinking agent, additive, and an organic solvent or water are added to the resulting pigment dispersed paste, whereby the black base coating (A) is available.

The content of the perylene black pigment and/or azomethine pigment and/or azo dye ranges from 0.1 to 50 parts by weight, preferably from 1 to 30 parts by weight, more preferably from 3 to 20 parts by weight, based on 100 parts by weight of the total solid content of the fundamental resin and crosslinking agent of the black base coating (A).

When the total content of the perylene black pigment and/or azomethine pigment and/or azo dye is less than 0.1 part by weight, a sufficient heat shielding effect is not available. When it exceeds 50 parts by weight, on the other hand, the black base coating (A) loses its stability.

Examples of the fundamental resin for the black base coating (A) include one or more than one resin selected from acrylic resins, vinyl resins, polyester resins, alkyd resins and urethane resins having one or more than one functional group selected from a hydroxyl group, a carboxyl group, a silicon-containing group, an epoxy group, and an isocyanate group which may be blocked.

Examples of the crosslinking agent include one or a mixture of two or more compounds selected from melamine resins, urea resins, polyisocyanate compounds which may be blocked, carboxyl-containing compounds and epoxy-containing compounds which are reactive with the functional group of the resin.

Examples of the organic solvent to be used for dilution of the coating include hydrocarbon solvents such as hexane, heptane, xylene, toluene and cyclohexane, ester solvents such as methyl acetate, ethyl acetate, ethylene glycol monomethyl ether acetate, and diethylene glycol monomethyl ether acetate, ether solvents such as isopropyl ether, ethylene glycol monomethyl ether and diethylene glycol monobutyl ether, alcohol solvents such as ethyl alcohol, butyl alcohol and hexyl alcohol, and ketone solvents such as methyl isobutyl ketone, methyl ethyl, ketone, isophorone and acetophenone.

When the black base coating (A) is aqueous coating, a fundamental resin containing a hydrophilic group, such as carboxyl group, hydroxyl group, methylol group, amino group, sulfonic acid group or polyoxyethylene bond, ordinarily a carboxyl group, in an amount enough to solubilize or disperse the resin in water is used. The resin can be solubilized or dispersed in water by neutralizing the hydrophilic group, thereby converting it into the corresponding alkali salt.

No particular limitation is imposed on the amount of the hydrophilic group, for example, a carboxyl group and it is selected freely depending on the solubilization or dispersion degree in water. Usually, it may be added within a range of from about 10 mgKOH/g or greater, preferably from 10 to 100 mgKOH/g, more preferably from 15 to 50 mgKOH/g based on the acid value. As the alkali substance to be used for neutralization, sodium hydroxide and various amines are usable as in the heat shielding coating (I).

The water dispersion of the resin is also available by emulsion polymerization of the above-described monomer component in the presence of a surfactant or water soluble resin. Alternatively, it is available by dispersing the above-described resin in water in the presence of, for example, an emulsifier. In this case, the fundamental resin may be utterly free of the above-described hydrophilic group or can contain it less compared with the water soluble resin.

As the crosslinking agent, one or a mixture of at least two compounds selected from melamine resins, urea resins, polyisocyanate compounds which may be blocked, carboxyl-containing compounds and epoxy-containing compounds can be used as in the organic solvent type coating.

In the black base coating (A), the fundamental resin is added in an amount of from 50 to 90 percent by weight, especially from 65 to 85 percent by weight, while the crosslinking agent is added in an amount of from 50 to 10 percent by weight, especially from 45 to 20 percent by weight, each based on the total solid content of them.

Upon application, the black base coating (A) is adjusted to have a viscosity of 10 to 30 seconds as measured using Ford Cup #4 at 20° C. and a solid content of 10 to 60 percent by weight, preferably from 20 to 50 percent by weight, and dry film thickness is adjusted to 15 μm or greater, preferably 20 μm to 50 μm by using a coating means such as air spray, airless spray or electrostatic coating equipment.

The perylene black pigment incorporated in the black base coating (A) has a reflectance peak at 660 nm or greater so that it assumes a little reddish dark chestnut color.

The azomethine pigment is advantageous because owing to higher jet blackness than the perylene black pigment, it attains high jet blackness and moreover, the concentration of the dye in the color clear coating (B) to be applied next can be reduced.

In order to counteract this reddish color tone and attain jet blackness, a suitable color clear coating (B) to be applied next is a black dye which reflects light of shorter wavelength, thereby assuming a blue color, and reflects infrared radiation, thereby not accumulating heat.

Color Clear Coating (B)

The film formed by the color clear coating (B) not only absorbs a sunlight but also completely absorbs, by the molecules or associative molecules of the dye, a scattered light appearing in the film of the black base coating (A) containing the perylene black pigment and/or azomethine pigment.

This coating therefore has a heat shielding function and at the same time, provides jet blackness as high as that attained by the use of a carbon black pigment.

As the fundamental resin and curing agent of the color clear coating (B), fundamental resins and crosslinking agents similar to those employed in the heat shielding coating (I) or black base coating (A) are usable. The fundamental resin is added in an amount of from 50 to 90 percent by weight, especially from 65 to 85 percent by weight, while the curing agent is added in an amount of from 50 to 10 percent by weight, especially, 45 to 20 percent by weight, each based on the total solid content of them.

Figure 5:
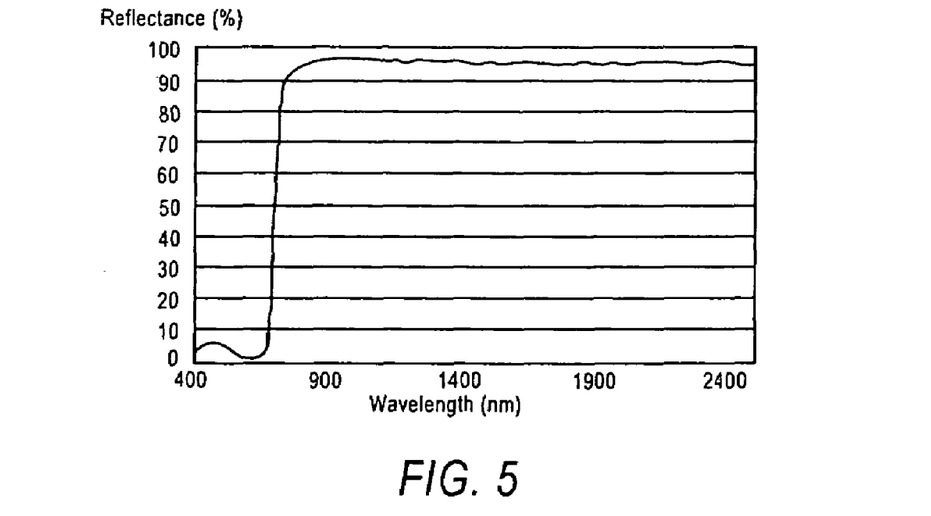
FIG. 5 is a graph showing a spectral reflectance curve of a black dye.

FIG. 5 shows a spectral reflectance curve of a black dye. The color tone of the black dye was studied by applying, onto a white coating plate to which a coating containing a rutile type titanium oxide had been applied, a black dye of a low concentration (1 percent by weight) was applied so as not to hide the white color. As is apparent from FIG. 5, since the black dye has a reflectance peak in a short wavelength region of 450 nm, it assumes a blue color and that since it has a reflectance in a long wavelength region of 660 nm or greater, it has a heat shielding function.

Examples of the black dye include dyes such as metal complex dyes, aniline dyes, di- and triarylmethane dyes, vinylon dyes, rhodamine dyes, acridine dyes, safranine dyes, oxazine dyes, quinoline dyes, thiazole dyes, azo dyes, azomethine dyes, polymethine or azopolymethine dyes, anthraquinone dyes, quinophthalone dyes, and phthalocyanine dyes. Of these, "NEOZAPON X-55", "NEOZAPON X-51", and "NEOZAPON X-53" (each, trade name of chromium complex dye; product of BASF) which are each a metal complex dye having a peak reflection in a short wavelength region, therefore assuming a blue color, and having good weather resistance, and at the same time, serve as an azo dye are particularly preferred. Extensive investigation by the present inventors has made it possible to find that the film acquires both heat shielding property and high jet blackness without damaging aesthetic quality.

The black dye is added in an amount of from 0.1 to 5.0 parts by weight, preferably from 0.2 to 2.0 parts by weight based on 100 parts by weight of the total solid content of the fundamental resin and curing agent. When the amount of the black dye is less than 0.1 parts by weight, the jet blackness cannot be attained. The amounts exceeding 5.0 parts by weight, on the other hand, lower weather resistance or physical properties of the film.

The color clear coating (B) can be prepared by adding resin components, that is, the fundamental resin and curing agent, black dye, and organic solvent, and if necessary a ultraviolet absorber or surface regulator, and then mixing and dispersing the resulting mixture by a "DISPER."

Upon application, the color clear coating (B) is preferably adjusted to have a viscosity, as measured by Ford Cup #4 (20° C.), of from 10 to 30 seconds. Conventionally employed coating means such as spray and electrostatic coating equipment can be employed for application of the coating.

The color clear coating (B) is applied onto an uncured coated surface of the black base coating (A) or a coated surface cured at 120 to 170° C. for 10 to 60 minutes, to give a dry film thickness of from 5 to 50 µm, preferably from 15 to 25 µm.

Clear Coating (C)

Onto the heat cured or uncured film of the color clear coating (B), a clear coating (C) may be applied to form another film.

The clear coating (C) is a transparent thermosetting coating available by dissolving a fundamental resin and crosslinking agent similar to those employed in the heat shielding coating (I), black base coating (A) or color clear coating (B) in an organic solvent or by dispersing them in water. As the organic solvent, one or more than one coating solvent selected from hydrocarbon type, ester type, ketone type and ether type solvents is usable.

The clear coating (C) may further contain an ultraviolet absorber, light stabilizer and/or surface regulator as needed. It may contain a coloring pigment, a metallic pigment or moire pattern pigment such as mica in an amount not impairing the transparency of the resulting film.

When the film of the clear coating (C) is a matte coating with 60° gloss of 60 or less, it is possible to use the film forming method of the present invention for the dash board of an automobile, thereby suppressing a temperature rise of the dashboard which will otherwise occur when the automobile is left under the blazing sun.

Upon application, the clear coating (C) adjusted to have a viscosity of 15 to 50 seconds, preferably 20 to 40 seconds as measured by Ford Cup #4 (at 20° C.) is applied by using air spray, airless spray or electrostatic coating equipment to give a film thickness, in terms of a cured film, of from 30 to 60 µm, especially from 35 to 45 µm.

Heat Curing

The heat shielding coating (I), black base coating (A), color clear coating (B) and clear coating (C) are baked at a temperature varied depending on the quality of a material to be applied. Heating at a temperature ranging from 100 to 180° C., preferably from 120 to 160° C. for 10 to 90 minutes when the applied material is a steel plate, and heating at a temperature ranging from 60 to 140° C., preferably from 90 to 120° C. for 10 to 90 minutes when the applied material is plastic make it possible to form a laminate film with a film structure having a heat shielding function.

Figure 2:
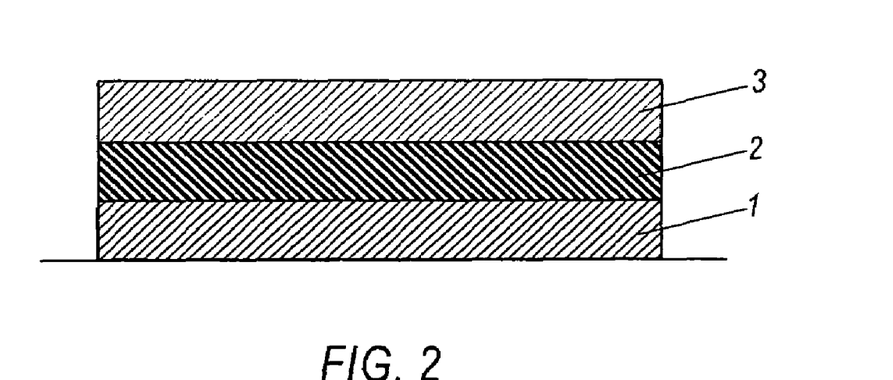
FIG. 2 is a schematic view of a laminate film having a film structure composed of heat shielding coating (I), black base coating (A), and color clear coating (B).

FIG. 2 is a cross-sectional view of a film obtained by the film forming method of the below-described "steps 1 to 4". By these steps, a highly jet-black laminate film having a function of shielding heat or infrared radiation can be obtained.

"A method of forming a film having a heat shielding function, which comprises the following steps 1 to 4:

Step 1: applying a heat shielding coating (I) containing a compound (i) which does not absorb infrared radiation and having a heat shielding function to form the corresponding film;

Step 2: applying thereto a black base coating (A) containing a perylene black pigment, and/or an azomethine pigment, and/or an azo dye to form the corresponding film, Step 3: applying a color clear coating (B) containing a black dye onto the heat cured or uncured film of the black base coating (A) to form the corresponding film, and Step 4: heat curing a laminate film having the films of the heat shielding coating (I), the black base coating (A) and the color clear coating (B) stacked one after another.

In FIG. 2, a film 1 is formed by Step 1 and does not absorb infrared radiation, a black base coating film 2 is formed by Step 2, and a color clear coating film 3 is formed by Step 3. These films stacked one after another are heat cured, whereby a laminate film having a heat shielding function is formed.

The above-described laminate film is a film free of a film of clear coating.

As the heat shielding coating (I), black base coating (A) and color clear coating (B), those employed in the laminate film 1 are usable. The laminate film which does not include the application step of the clear coating (C) can be used for members or sites required to have heat shielding function and jet blackness but not giving priority to its finish appearance, for example, parts of electric appliances or motorbikes, automobile interior, and window sash.

The heat shielding coating (I), black base coating (A) and color clear coating (B) are baked at a temperature varied depending on the material to be applied. Heating at a temperature ranging from 100 to 180° C., preferably from 120 to 160° C. for 10 to 90 minutes when the material to be applied is a steel plate, and heating at a temperature ranging from 60 to 140° C., preferably from 90 to 120° C. for 10 to 90 minutes when the material is plastic make it possible to form a laminate film with a film structure having a heat shielding function.

Figure 3:
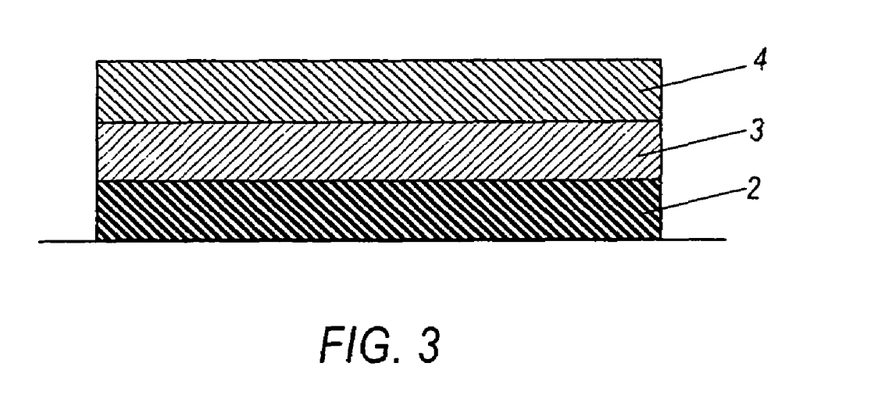
FIG. 3 is a schematic view of a laminate film having a film structure composed of black base coating (A), color clear coating (B) and clear coating (C) and being imparted with heat shielding property and jet blackness.

FIG. 3 is a cross-sectional view of a film obtained by the film forming method of the below-described "steps 1 to 4". By these steps, a highly jet-black laminate film 3 having a function of shielding heat or infrared radiation can be obtained.

The steps 1 to 4 are as follows:

Step 1: applying a black base coating (A) containing a perylene black pigment, and/or an azomethine pigment, and/or an azo dye to form the corresponding film, Step 2: applying a color clear coating (B) containing a black dye onto the heat cured or uncured film of the black base coating (A) to form the corresponding film, and Step 3: applying a clear coating (C) to form the corresponding film, and Step 4: heat curing a laminate film having the films of the black base coating (A), the color clear coating (B), and the clear coating (C) stacked one after another.

Similar coatings employed in the laminate film 1 are usable for the black base coating (A), color clear coating (B) and clear coating (C), respectively. This film forming method of the laminate film 3 which does not include the application step of the heat shielding coating (I) and therefore has less steps than the film forming method of the laminate film 1 can be used for members or sites which are not required to be as excellent in the heat shielding effect as the laminate film 1 but give priority to finish appearance with jet blackness.

In FIG. 3, a black base coating film 1 is formed by Step 1, a color clear coating film 2 is formed by Step 2, and a clear coating film 3 is formed by Step 3. These films stacked one after another are heat cured, whereby a laminate film having a heat shielding function is formed.

The above-described laminate film is a film free of a film which does not absorb infrared radiation.

The black base coating (A), color clear coating (B) and clear coating (C) are baked at a temperature varied depending on the material to be applied. Heating at a temperature ranging from 100 to 180° C., preferably from 120 to 160° C. for 10 to 90 minutes when the material to be applied is a steel plate, and heating at a temperature ranging from 60 to 140° C., preferably from 90 to 120° C. for 10 to 90 minutes when the material is plastic make it possible to form the laminate film 3 with a film structure having a heat shielding function.

EXAMPLES

The present invention will hereinafter be described in further detail by Examples. It should however be borne in mind that the present invention is not limited by them.

Preparation Example 1

Preparation of Pigment Dispersed Paste No.1

Pigment dispersed paste No.1 was prepared by uniformly mixing and dispersing 153.9 parts of 65% "AlUPASTE 7680NS" (trade name of aluminum paste; product of Toyo Aluminum) in butyl cellosolve, followed by addition of 100 parts of a polyester resin (hydroxyl number: 95 mgKOH/g, acid value: 20 mgKOH/g, number average molecular weight: about 8000).

Preparation Example 2

Preparation of Pigment Dispersed Paste No.2

Pigment dispersed paste No.2 having a solid content of 40 percent by weight was prepared by uniformly mixing a polyester resin (hydroxyl number: 95 mgKOH/g, acid value: 20 mgKOH/g, number average molecular weight: about 8000), 500 parts of "JR-903" (trade name of titanium white; product of Tayca), 0.5 part of "CARBON MA-100" (trade name of carbon black; product of Mitsubishi Chemical) and 0.05 part of "TODA COLOR 130R" (trade name of Iron Oxide red; product of Toda Kogyo), and dispersing the resulting mixture with 1 mmØ glass beads in a pain shaker for 2 hours.

Preparation Example 3

Pigment dispersed paste No.3 having a composition as shown in Table 1 was obtained.

The components of each of the pigment dispersed pastes No.1 to No.3 are shown below.

TABLE 1

| Components of each of pigment dispersed pastes for heat shielding coating | | | |
|---|---|---|---|
| | Preparation Example 1 | Preparation Example 2 | Preparation Example 3 |
| | Pigment dispersed paste | | |
| | No. 1 | No. 2 | No. 3 |
| Polyester resin | 143 (100) | 143 (100) | 143 (100) |
| JR-903 | | 500 | 56.7 |
| Carbon MA-100 | | 0.5 | 9.3 |
| Toda Color 130R | | 0.05 | |
| 65% ALUPASTE 7680NS | 153.9 (100) | | |
| 40% Pigment dispersed paste | 500 (200) | 1501.4 (600.6) | 415 (166) |

Numeral in Parentheses Means Solid Content

Preparation Example 4

Preparation of a Polyester Resin Solution

In a reaction vessel were charged 0.7 mol of neopentyl glycol, 0.3 mole of trimethylolpropane, 0.4 mole of phthalic anhydride and 0.5 mole of adipic acid. After reacting the resulting mixture at 200 to 230° C. for 5 hours, 0.03 mol of trimellitic anhydride was added. The resulting mixture was reacted at 180° C. for 1 hour. Butyl cellosolve was then added, whereby a polyester resin solution having an acid value of 40 mgKOH/g, a hydroxyl number of 70 mgKOH/g, a number average molecular weight of about 6000 and a solid content of 70% was obtained.

To 100 parts of the polyester resin solution thus obtained, 4 parts of dimethylaminoethanol was added to neutralize the solution, followed by the addition of isopropyl alcohol, whereby a polyester resin solution having a solid content of 60% was obtained.

Preparation Example 5

Preparation of an Acrylic Resin Solution

To 60 parts of butyl cellosolve heated to 120° C., "Monomer Component 1 (Note 2)" was added over 3 hours, followed by copolymerization, whereby an acrylic resin solution having an acid value of 40 mgKOH/g, a hydroxyl number of 52 mgKOH/g, number average molecular weight of about 10000 and a solid content of 60% was obtained.

(Note 2): "Monomer component 1" is composed of 30 parts of methyl methacrylate, 23 parts of ethyl methacrylate, 30 parts of butyl methacrylate, 12 parts of hydroxyethyl methacrylate, 5 parts of methacrylate and 2 parts of α,α'-azobisisobutylonitrile.

To 100 parts of the acrylic resin solution thus obtained, 3.5 parts of dimethylaminoethanol was added to neutralize the solution, followed by the addition of isopropyl alcohol, whereby an acrylic resin solution having a solid content of 50% was obtained.

Preparation Example 6

Preparation of a Polyurethane Emulsion

A terminal-NCO prepolymer having an NCO content of 4.0% was obtained by reacting 230 parts of polybutylene adipate (number average molecular weight: 2,000), 230 parts of polycaprolactone diol (number average molecular weight of 2,000), 46 parts of dimethylolpropionic acid, 13 parts of 1,4-butanediol and 240 parts of isophorone diisocyanate.

After addition of 330 parts of acetone to the resulting prepolymer to dissolve the latter in the former uniformly, 31 parts of triethylamine was added under stirring. To the reaction mixture, 1200 g of deionized water was added. The resulting water dispersion was maintained at 50° C. for 2 hours to complete water extension reaction, followed by removal of acetone under reduced pressure, whereby a polyurethane emulsion having a solid content of 42% was obtained.

Preparation of a Heat Shielding Coating (I)

Preparation Example 7

Preparation of Heat Shielding Coating No.1

A heat shielding coating No.1 excellent in heat shielding property and containing aluminum flakes was obtained by adding 70 parts (solid content: 42 parts) of the polyester resin solution obtained in Preparation Example 4, 107.5 parts (solid content: 43 parts) of "DESMODULE TP LS2310" (trade name of blocked isocyanate; product of Sumitomo Bayer Urethane) and 75 parts (solid content: 40 parts) of 40% pigment dispersed paste No.1 and stirring the resulting mixture.

Preparation Example 8

Preparation of Heat Shielding Coating No.2

In a similar manner to Preparation Example 7 except for the use of Pigment dispersed paste No.2 instead of Pigment dispersed paste No.1, Heat shielding coating No.2 was obtained. Heat shielding coating No.2 almost free of carbon black is composed mainly of titanium oxide and is therefore excellent in infrared reflection.

Preparation Example 9

Preparation of Heat Shielding Coating No.3

In a similar manner to Preparation Example 7 except for the use of Pigment dispersed paste No.3 instead of Pigment dispersed paste No.1, Heat shielding coating No.3 was obtained. Heat shielding coating No.3 rich in carbon black is inferior in the infrared reflection capacity.

Components of each of Heat shielding coatings Nos.1 to 3 are shown in Table 2.

TABLE 2

Components of Heat Shielding Coating

| | Preparation Example 7 | Preparation Example 8 | Preparation Example 9 |
|---|---|---|---|
| | Heat shielding coating | | |
| | No. 1 | No. 2 | No. 3 |
| Polyester resin solution | 70 | 70 | 70 |
| | (42) | (42) | (42) |
| 40% Pigment dispersed paste No. 1 | 75 (30) | | |
| 40% Pigment dispersed paste No. 2 | | 225.2 (90.1) | |
| 40% Pigment dispersed paste No. 3 | | | 62.25 (24.9) |
| Total | 252.5 | 402.7 | 239.75 |
| ( ) solid content | (115) | (175.1) | (109.9) |

Preparation of a Black Pigment Paste

Preparation Example 10

Preparation of Black Pigment Paste No.1

To 200 parts (solid content: 100 parts) of the acrylic resin solution obtained in Preparation Example 5 and 75 parts of "PALIOGEN BLACK L-0084" (trade name of perylene black pigment; product of BASF), 162.5 parts of deionized water was added, followed by the addition of 1 mmØ glass beads. The resulting mixture was dispersed by a paint shaker for 2 hours, whereby Black pigment paste No.1 having a particle size of 0.1 μm or less and a solid content of 40 percent by weight was obtained.

Preparation Example 11

Preparation of Black Pigment Paste No.2

In a similar manner to Preparation Example 10 except for the use of "CHROMOINE BLACK A-1103" (trade name of azomethine pigment; product of Dainichiseika Color & Chemicals) instead of "PALIOGEN BLACK L-0084" as a black pigment, Black pigment paste No.2 having an average particle size of 0.1 μm or less and a solid content of 40 percent by weight was obtained.

Preparation Example 12

Preparation of Black Pigment Paste No.3

In a similar manner to Preparation Example 10 except for the use of "CARBON BLACK MONARCH 1300" (trade name of carbon black pigment; product of Cabot) instead of "PALIOGEN BLACK L-0084" as a black pigment, Black pigment paste No.3 having an average particle size of 0.1 μm or less and a solid content of 40 percent by weight was obtained.

Components of each of Black pigment pastes Nos.1 to 3 are shown in Table 3.

TABLE 3

Components of each of Black pigment pastes

|  | Preparation Example 10 | Preparation Example 11 | Preparation Example 12 |
|---|---|---|---|
|  | Black pigment paste | | |
|  | No. 1 | No. 2 | No. 3 |
| Acrylic resin solution | 200 (100) | 200 (100) | 200 (100) |
| PALIOGEN BLACK L-0084 | 75 (75) | | |
| CHROMOINE BLACK A-1103 | | 75 (75) | |
| CARBON BRACK MONARCH 1300 | | | 75 (75) |
| Deionized water | 162.5 | 162.5 | 162.5 |
| Total | 437.5 | 437.5 | 437.5 |
| ( ) solid content | (175) | (175) | (175) |

Preparation of Black Base Coating (A)

Preparation Example 13

Preparation of Black Base Coating No.1

Black pigment paste No.1 was added to the acrylic resin obtained in Preparation Example 5, followed by the addition of deionized water to disperse the resulting mixture therein.

To the dispersion thus obtained, the polyester resin solution obtained in Preparation Example 4, the polyurethane emulsion obtained in Preparation Example 11, and a melamine resin were added. Deionized water was then added to the resulting mixture, whereby Black base coating No.1 having a solid content of 20% was obtained.

Preparation Examples 14 to 15

Black base coatings Nos.2 and 3 were obtained as in

Preparation Example 13.

Components of the black base coatings are shown in Table 4.

TABLE 4

Components of each of Black base coatings

|  | Preparation Example 13 | Preparation Example 14 | Preparation Example 15 |
|---|---|---|---|
|  | Black base coating | | |
|  | No. 1 | No. 2 | No. 3 |
| Black pigment paste No. 1 | 116.7 (46.6) | | |
| Black pigment paste No. 2 | | 116.7 (46.6) | |
| Black pigment paste No. 3 | | | 29.2 (11.7) |
| Deionized water | 40 | 40 | 40 |
| Acrylic resin solution | 6.8 (3.4) | 6.8 (3.4) | 46.6 (23.3) |
| Polyester resin solution | 25 (15) | 25 (15) | 25 (15) |
| Polyurethane emulsion | 119 (20) | 119 (20) | 119 (20) |
| Melamine resin | 43.8 (35) | 43.8 (35) | 43.8 (35) |
| Deionized water | 248.7 | 248.7 | 173.7 |
| Total | 600 | 600 | 525 |
| ( ) Solid content | (120) | (120) | (105) |

Preparation of Color Clear Coating (B)

Preparation Example 16

Preparation of Color Clear Coating No.1

In an organic solvent (1:1 (weight ratio) mixture of ethyl acetate and xylene), 75 parts of a hydroxyl-containing acrylic resin (hydroxyl number: 85, acid value: 3, number average molecular weight: 12000) and 25 parts of butyl-etherified melamine resin (number average molecular weight: 1000) were mixed and dispersed, followed by the addition of 1.0 part of "NEOZAPON X-55" (trade name of azo type chromium complex dye; product of BASF), whereby Color clear coating No.1 having a solid content of 40% and a viscosity, as measured by Ford Cup #4 at 20° C., of 20 seconds was obtained.

Preparation Example 17

Preparation of Color Clear Coating No.2

In an organic solvent (1:1 (weight ratio) mixture of ethyl acetate and xylene), 75 parts of a hydroxyl-containing acrylic resin (hydroxyl number: 85, acid value: 3, number average molecular weight: 12000) and 25 parts of a butyl-etherified melamine resin (number average molecular weight: 1000) were mixed and dispersed, followed by the addition of 1 part of "PALIOGEN BLACK L-0084" (trade name of perylene black pigment, product of BASF) and a sufficient amount of an organic solvent, whereby Color clear coating No.2 having a solid content of 40% and a viscosity, as measured by Ford Cup #4 at 20° C., of 20 seconds was obtained.

Components of each of the color clear coatings are shown in Table 5.

TABLE 5

Components of each of color clear coatings

|  | Preparation Example 15 Color clear coating No. 1 | Preparation Example 16 Color clear coating No. 2 |
|---|---|---|
| NEOZAPON Black X-55 (azo type chromium complex dye) | 1 (1) | |
| PALIOGEN BLACK L-0084 (perylene black pigment) | | 1 (1) |
| Acrylic resin solution | 100 (50) | 100 (50) |
| Polyester resin solution | 83 (50) | 83 (50) |
| Polyurethane emulsion | 238 (100) | 238 (100) |
| Deionized water | 583 | 583 |
| Solid content: 20% Color clear coating | 1005 (201) | 1005 (201) |

Clear Coating (C)

In a similar manner to Preparation Example 17 by using "MAGICRON TC-71" (trade name of acrylic resin—melamine curing organic solvent type clear coating; product of Kansai Paint) as a transparent clear, a clear coating having a viscosity, as measured by Ford Cup #4 at 20° C., of 20 seconds was prepared.

Preparation Example 17

Preparation of Matte Clear Coating A

Matte clear coating A was prepared by adding, as a mat pigment, "CARPLEX BS-304N" (trade name of fine silica particles; product of Shionogi) to "MAGICRON TC-71" in an amount of 10 parts based on a solid content, and stirring and mixing the resulting mixture. The viscosity of the coating was adjusted to 20 seconds as measured by Ford Cup #4 at 20° C.

Preparation of a Test Plate

As a material to be applied, a test plate was prepared by applying "ELECRON GT-10LF" (trade name of epoxy resin type cationic electrodeposition coating which provides a film of N5.5 gray in brightness; product of Kansai Paint) to a cold rolled steel (size: 100×80×0.8 mm) subjected to chemical treatment "PALBOND #3020" (trade name; product of Nihon Parkerizing, zinc phosphate coating treatment).

Example 1

Step 1: Heat shielding coating No.1 was applied by air spray to give a dry film thickness of 35 μm and a hiding film thickness of 25 μm, followed by baking at 140° C. for 20 minutes.

Step 2: Black base coating No.1 was applied by air spray to give a dry film thickness of 15 μm, followed by setting at room temperature for 5 minutes.

Step 3: Color clear coating No.1 was applied to give a dry film thickness of 30 μm, followed by setting at room temperature for 5 minutes.

Step 4: "MAGICRON TC-71" (trade name of clear coating; product of Kansai Paint) was applied to give a dry film thickness of 30 μm.

Step 5: Heating was conducted at 140° C. for 20 minutes to yield Cured film 1—1 . The film is shown in FIG. 1.

Example 2, Example 3 and Comparative Examples 1 to 3

Coatings and steps as described in Table 6 were employed to yield Cured films 1—1 to 1–6. Film thickness formed by each of the coatings was similar to that in Example 1.

TABLE 6

| | | Ex. 1 | Ex. 2 | Ex. 3 | Comp. Ex. 1 | Comp. Ex. 2 | Comp. Ex. 3 |
|---|---|---|---|---|---|---|---|
| Cured film | | 1-1 | 1-2 | 1-3 | 1-4 | 1-5 | 1-6 |
| Step 1 | Heat shielding coating | No. 1 | No. 1 | No. 2 | No. 3 | No. 1 | No. 1 |
| | Feature | Aluminum | Aluminum | N8 white | Carbon black | Aluminum | → |
| Step 2 | Black base coating | No. 1 | No. 2 | No. 1 | No. 1 | → | No. 3 |
| | Feature | Perylene black pigment | Azomethine pigment | Perylene black pigment | Perylene black pigment | → | Carbon black |
| Step 3 | Color clear coating | No. 1 | → | No. 1 | No. 2 | No. 1 | |
| | Feature | Azo type chromium complex dye | → | → | Azo type chromium complex dye | Perylene black pigment | Azo type chromium complex dye |
| Step 4 | Clear coating | TC-71 | → | → | → | → | → |
| Step 5 | Baking temperature | at 140° C. for 20 min | → | → | → | → | → |
| Film performance | (Note 5) Brightness L* | 1.31 | 1.15 | 1.32 | 1.3 | 7.6 | 1.15 |
| | (Note 6) Jet blackness | A | A | A | A | C | A |
| | (Note 7) Back-side temperature of coating plate (° C.) | 51 | 50.5 | 58 | 70 | 51 | 73.2 |
| | (Note 8) 60° gloss | 90 | 90 | 90 | 91 | 90 | 90 |

Example 4

Step 1: Heat shielding coating No.1 was applied by air spray to give a dry film thickness of 35 μm and a hiding film thickness of 25 μm, followed by baking at 140° C. for 20 minutes.

Step 2: Black base coating No.1 was applied by air spray to give a dry film thickness of 15 μm, followed by setting at room temperature for 5 minutes.

Step 3: Color clear coating No.1 was applied to give a dry film thickness of 30 μm, followed by setting at room temperature for 5 minutes.

Step 4: Heating was conducted at 140° C. for 20 minutes to yield Cured film 2-1. The film is shown in FIG. 2.

Examples 5 and 6, Comparative Examples 4 and 5

Coatings and steps as described in Table 7 were employed to yield Cured films 2-1 to 2-5. Film thickness of each of the coatings is similar to that in Example 4.

TABLE 7

Step and Film performance (Laminate film 2)

|  |  | Ex. 4 | Ex. 5 | Ex. 6 | Comp. Ex. 4 | Comp. Ex. 5 |
|---|---|---|---|---|---|---|
| Cured film |  | 2-1 | 2-2 | 2-3 | 2-4 | 2-5 |
| Step 1 | Heat shielding coating | No. 1 | No. 2 | No. 1 | No. 3 | No. 1 |
|  | Feature | Aluminum | N8 white | Aluminum | Carbon black | → |
| Step 2 | Black base coating | No. 1 | → | No. 2 | No. 1 | No. 3 |
|  | Feature | Perylene black | Perylene black | Azomethine pigment | Perylene black pigment | Carbon black |
| Step 3 | Color clear coating | No. 1 | → | → | No. 1 | No. 2 |
|  | Feature | Azo type chromium complex dye | → | → | Azo type chromium complex dye | Perylene black pigment |
| Step 4 | Baking temperature | at 140° C. for 20 min | → | → | → | → |
| Film performance | (Note 6) Brightness L* | 1.28 | 1.27 | 1.14 | 1.3 | 6.5 |
|  | (Note 6) Jet blackness | A | A | A | A | C |
|  | (Note 7) Back-side temperature of coating plate (° C.) | 51.1 | 57.5 | 50 | 70 | 73.2 |
|  | (Note 8) 60° gloss | 90 | 90 | 90 | 91 | 90 |

Example 7

Step 1: Black base coating No.1 was applied by air spray to give a dry film thickness of 15 μm, followed by setting at room temperature for 5 minutes.

Step 2: Color clear coating No.1 was applied to give a dry film thickness of 30 μm, followed by setting at room temperature for 5 minutes.

Step 3: "MAGICRON TC-71" was applied to give a dry film thickness of 30 μm.

Step 4: Heating was conducted at 140° C. for 20 minutes to yield Cured film 3-1. The film is illustrated in FIG. 3.

Example 8, Comparative Example 6

Cured films 3-2 to 3-3 were obtained using coatings and steps as described in Table 8. The film thickness of each of the coatings is adjusted as in Example 7.

TABLE 8

Step and Film performance (Laminate film 3)

|  | Ex. 7 | Ex. 8 | Comp. Ex. 6 |
|---|---|---|---|
| Cured film | 3-1 | 3-2 | 3-3 |
| Step 1 |  |  |  |
| Black base coating | No. 1 | No. 2 | No. 3 |
| Feature | Perylene black pigment | Azomethine pigment | Carbon black |
| Step 2 |  |  |  |
| Color clear coating | No. 1 | ← | ← |
| Feature | Azo type chromium complex dye | ← | ← |
| Step 3 |  |  |  |
| Clear coating | TC-71 | ← | ← |
| Step 4 |  |  |  |
| Baking temperature | at 140° C. for 20 min | ← | ← |

TABLE 8-continued

Step and Film performance (Laminate film 3)

|  | Ex. 7 | Ex. 8 | Comp. Ex. 6 |
|---|---|---|---|
| Cured film | 3-1 | 3-2 | 3-3 |
| Film performance |  |  |  |
| (Note 5) Brightness L* | 1.24 | 1.13 | 1.14 |
| (Note 6) Jet blackness | A | A | A |
| (Note 7) Back temperature of coated plate (° C.) | 64 | 65 | 74 |
| (Note 8) 60° gloss | 90 | 90 | 91 |

Preparation of Matte Film

Example 9

Step 1: Black base coating No.1 was applied by air spray to give a dry film thickness of 15 μm, followed by setting at room temperature for 5 minutes.

Step 2: Color clear coating No.1 was applied to give a dry film thickness of 30 μm, followed by setting at room temperature for 5 minutes.

Step 3: Matte coating A was applied to give a dry film thickness of 30 μm.

Step 4: Heating was conducted at 140° C. for 20 minutes to yield Cured film 4-1.

Comparative Example 7

Step 1: Black base coating No.1 was applied by air spray to give a dry film thickness of 15 μm, followed by setting at room temperature for 5 minutes.

Step 2: Color clear coating No.1 was applied to give a dry film thickness of 30 μm, followed by setting at room temperature for 5 minutes.

Step 3: TC-71 was applied to give a dry film thickness of 30 μm.

Step 4: Heating was conducted at 140° C. for 20 minutes to yield Cured film 4-2.

Steps of Cured films 4-1 to 4-2 are described in Table 9. Each film thickness is adjusted as in Example 9.

TABLE 9

Matte film

|  | Ex. 9 | Comp. Ex. 7 |
|---|---|---|
|  | Cured film | |
|  | 4-1 | 4-2 |
| Step 1 | | |
| Black base coating | No. 1 | No. 3 |
| Feature | Perylene black | Carbon black |
| Step 2 | | |
| Color clear coating | No. 1 | No. 1 |
| Feature | Azo type chromium complex dye | ← |
| Step 3 | | |
| Matte coating | Matte coating A | TC-1 |
| Step 4 | | |
| Baking temperature | at 140° C. for 20 min | ← |
| Film performance | | |
| (Note 5) Brightness L* | 2.51 | 1.3 |
| (Note 6) Jet blackness | B | A |
| (Note 7) Backside temperature of coated plate (° C.) | 63 | 75 |
| (Note 8) 60° gloss | 23 | 90 |

(Note 5) Brightness L*: L* value at 45 degree was determined using a portable multi-angle spectrophotometer "MA68" of X-rite/USA. The smaller the value, the greater the jet blackness and the higher the aesthetic value as a black color to be applied.

(Note 6) Jet blackness: Result of the visual observation, under an artificial sunlight, of the coated plate was indicated. A means good jet blackness (as black as Japanese lacquer or piano), B means inferior jet blackness and C means absence of jet blackness.

(Note 7) Backside temperature of coated plate (° C.): The upper portion of a heat insulated cubic box about 40 cm in side was cut off and an A4 test coated plate made of aluminum was placed on it. A thermocouple sensor was fixed onto the backside of the coated plate with a Scotch tape to measure the temperature on the backside. The coated plate was exposed to "HALOGEN LIGHT" (LPL1500) used as a heat source from a position 30 cm vertically apart from the coated plate. The temperature was measured after a reasonable period of time.

(Note 8) 60° Gloss: Reflectance of the film when the incident angle and receptor angle were each 60° was measured in accordance with the 60° specular gloss of ISO K-5400 7.6 (1990). The gloss was indicated as a percentage of the gloss on the reference plane designated as 100.

When a conventional coating containing carbon black is applied to an automobile or motorbike, the resulting film absorbs infrared radiation and its temperature increases, leading to lowering in the effect of the air conditioner of the automobile, or causing almost a burn owing to a direct touch to the dashboard. According to the film forming method of the present invention, on the other hand, a laminate film having a film structure realizing both a heat shielding property and jet blackness with clearness can be obtained. Incorporation of a dye in a color clear coating has a great contribution to the above-described effect.

The laminate film is available by changing, as needed, the film structure composed of the heat shielding coating (I), black base coating (A), color clear coating (B), and clear coating (C) in consideration of the heat shielding effect, jet blackness, finish appearance and cost.

Moreover, the film of the clear coating can be imparted with a matte effect in addition to the heat shielding effect as needed. If so, the resulting laminate film can be used for the dashboard inside of a car.

Although only some exemplary embodiments of this invention have been described in detail above, those skilled in the art will readily appreciated that many modifications are possible in the exemplary embodiments without materially departing from the novel teachings and advantages of this invention. Accordingly, all such modifications are intended to be included within the scope of this invention.

The disclosure of Japanese Patent Application No. 2002-381015 filed Dec. 27, 2002 including specification, drawings and claims is incorporated herein by reference in its entirety.

What is claimed is:

1. A laminate film having a heat shielding function and comprising a heat shielding coating (I), a black base coating (A), and a color clear coating (B),
   wherein said heat shielding coating (I), said black base coating (A), and said color clear coating (B) are stacked one after another and heat cured,
   wherein said heat shielding coating (I) comprises a compound which does not absorb infrared radiation and having a heat shielding function;
   wherein said black base coating (A) comprises a perylene black pigment, and/or an azomethine pigment, and/or an azo dye, and
   wherein said color clear coating (B) comprises a black dye.

2. A laminate film having a heat shielding function and comprising a heat shielding coating (I), a black base coating (A), a color clear coating (B) and a clear coating (C),
   wherein said heat shielding coating (I), said black base coating (A), said color clear coating (B) and said clear coating (C) are stacked one after another and heat cured,
   wherein said heat shielding coating (I) comprises a compound which does not absorb infrared radiation and has a heat shielding function,
   wherein said black base coating (A) comprises a perylene black pigment, and/or an azomethine pigment, and/or an azo dye, and
   wherein said color clear coating (B) comprises a black dye.

3. The laminate film according to claim 2 or 1, wherein the heat shielding coating (I) comprises, based on 100 parts by weight of the resin solid content thereof, 0.1 to 200 parts by weight of the compound which does not absorb infrared radiation.

4. The laminate film according to claim 2 or 1, wherein the heat shielding coating (I) is at a shielding film thickness of 25 µm or greater.

5. The laminate film according to any one of claims 2 and 1, wherein the black base coating (A) is at a dry film thickness of 10 µm or greater.

6. The laminate film according to any one of claims 2 and 1, wherein the color clear coating (B) is at a dry film thickness of from 5 to 50 µm.

7. The laminate film according to claim 2, wherein the clear coating (C) is at a cured film thickness of from 30 to 60 μm.

8. The laminate film according to claim 2 or 1, wherein the compound, in said heat shielding coating (I), which does not absorb infrared radiation is an azo dye.

9. The laminate film according to any one of claims 2 and 1, wherein the black base coating (A) further comprises a resin and a crosslinking agent, and wherein the perylene black pigment and/or azomethine pigment and/or azo dye is in an amount ranging from 0.1 to 50 parts based on 100 parts by weight of the total solid content of said resin and crosslinking agent of the black base coating (A).

10. The laminate film according to claim 2 or 1, wherein the heat shielding coating (I) is free of carbon black.

11. The laminate film according to claim 2 or 1, wherein the compound which does not absorb infrared radiation and has a heat shielding function is selected from a group consisting of an aluminum flake, a titanium oxide, a perylene black pigment, an azomethine pigment, an ochre, a colcothar, a phthalocyanine blue, a phthalocyanine green, and an inorganic calcined pigment.

12. The laminate film according to claim 2 or 1, wherein the color clear coating (B) comprises, based on 100 parts by weight of the resin solid content thereof, 0.1 to 5.0 parts by weight of azo type chromium complex dye.

13. The laminate film according to claim 2 or 1, wherein the black base coating (A) has a transmittance in the infrared range of from 700 to 2500 nm.

14. A method of forming the laminate film according to claim 2, said method comprising:
    applying the heat shielding coating (I) comprising the compound which does not absorb infrared radiation and having a heat shielding function to form the corresponding heat cured or uncured film;
    applying thereto the black base coating (A) comprising the perylene black pigment, and/or the azomethine pigment, and/or the azo dye to form the corresponding film, applying the color clear coating (B) comprising the black dye on the heat cured or uncured film of the black base coating (A) to form the corresponding film,
    applying thereto the clear coating (C) to form the corresponding film; and
    heat curing the heat shielding coating (I), the black base coating (A), the color clear coating (B) and the clear coating (C) to obtain the laminate.

15. A method of forming the laminate film according to claim 1, said method comprising:
    applying the heat shielding coating (I) comprising the compound which does not absorb infrared radiation and having a heat shielding function to form the corresponding film;
    applying thereto the black base coating (A) comprising the perylene black pigment, and/or the azomethine pigment, and/or the azo dye to form the corresponding film,
    applying the color clear coating (B) comprising the black dye onto the heat cured or uncured film of the black base coating (A) to form the corresponding film,
    heat curing the heat shielding coating (I), the black base coating (A) and the color clear coating (B) to obtain the laminate.

16. The method according to claim 14 or 15, wherein the heat shielding coating (I) comprises, based on 100 parts by weight of the resin solid content thereof 0.1 to 200 parts by weight of the compound which does not absorb infrared radiation.

17. The method according to claim 14 or 15, wherein the heat shielding coating (I) is applied to obtain a shielding film thickness of 25 μm or greater.

18. The method according to any one of claims 14 and 15, wherein the black base coating (A) is applied to obtain a dry film thickness of 10 μm or greater.

19. The method according to any one of claims 14 and 15, wherein the color clear coating (B) is applied to obtain a dry film thickness of from 5 to 50 μm.

20. The method according to claim 14, wherein the clear coating (C) is applied to obtain a cured film thickness of from 30 to 60 μm.

21. The method according to claim 14 or 15, wherein the compound, in the heat shielding coating (I), which does not absorb infrared radiation is an azo dye.

22. The method according to claim 14 or 15, wherein the heat shielding coating (I) is free of carbon black.

23. The method according to claim 14 or 15, wherein the compound which does not absorb infrared radiation and has a heat shielding function is selected from a group consisting of an aluminum flake, a titanium oxide, a perylene black pigment, an azomethine pigment, an ochre, a colcothar, a phthalocyanine blue, a phthalocyanine green, and an inorganic calcined pigment.

24. The method according to claim 14 or 15, wherein the color clear coating (B) comprises, based on 100 parts by weight of the resin solid content thereof, 0.1 to 5.0 parts by weight of azo type chromium complex dye.

25. The method according to claim 14 or 15, wherein the black base coating (A) has a transmittance in the infrared range of from 700 to 2500 nm.

26. An article coated with the laminate film as claimed in any one of claims 2 and 1.

* * * * *